United States Patent [19]
Yamamoto et al.

[11] Patent Number: 5,941,937
[45] Date of Patent: Aug. 24, 1999

[54] LAYOUT STRUCTURE FOR BARREL SHIFTER WITH DECODE CIRCUIT

[75] Inventors: Hiroaki Yamamoto; Yoshito Nishimichi, both of Osaka, Japan

[73] Assignee: Matsushita Electric Industrial Co., Ltd., Japan

[21] Appl. No.: 08/959,374

[22] Filed: Oct. 28, 1997

[30] Foreign Application Priority Data

Oct. 29, 1996 [JP] Japan ...................................... 8-286358

[51] Int. Cl.⁶ ...................................................... G06F 5/01
[52] U.S. Cl. .......................................................... 708/209
[58] Field of Search ............................................ 708/209

[56] References Cited

U.S. PATENT DOCUMENTS

| | | | |
|---|---|---|---|
| 4,653,019 | 3/1987 | Hodge et al. | 708/209 |
| 5,465,223 | 11/1995 | Nishimura | 708/209 |
| 5,477,477 | 12/1995 | Saitou | 708/209 |
| 5,652,718 | 7/1997 | Thomson et al. | 708/209 |
| 5,777,906 | 7/1998 | Lav et al. | 708/209 |

FOREIGN PATENT DOCUMENTS

07141146  2/1995  Japan .

*Primary Examiner*—David H. Malzahn
*Attorney, Agent, or Firm*—McDermott, Will & Emery

[57] ABSTRACT

Two flip-flops and decode circuits are provided. Whereas the one flip-flop receives 1-bit bit-shift-amount data B(1), the other flip-flop receives 1-bit bit-shift-amount data B(0). The decode circuits decode the bit-shift-amount data from the flip-flops. The flip-flops and the decode circuits are laterally laid out in a line. The flip-flops and the decode circuits are symmetrically laid out in bits, together with four flip-flops that receive respective 1-bit data to be bit-shifted (data A(3) to A(0)) and a bit shifter that bit-shifts the data A(3) to A(0) for a bit shift amount from said decode circuits, to form a bit slice structure and to be arranged within a data path. Accordingly, it is possible to achieve an effective reduction of the length of signal wiring over which bit-shift-amount data propagate. The reduction of wire load can be accomplished. The speed-up of data bit shift processing can be realized.

5 Claims, 7 Drawing Sheets

LAYOUT STRUCTURE FOR BARREL SHIFTER WITH DECODE CIRCUIT

BACKGROUND OF THE PRESENT INVENTION

The present invention relates to an improvement to barrel shifters utilizable in, for example, microprocessor data processing. This invention relates more specifically to the speed-up of barrel shifter operations.

Recently, the design of semiconductor integrated circuits (SICs) has become more and more automatized for the reduction of SIC design time. For barrel shifters capable of carrying out any amount of bit shift with a single operation, bit slice structure, i.e., data path architecture having a mask layout that is symmetrical in bits, has been employed widely for a speed-up in the rate of data processing and a reduction in the chip area.

A barrel shifter designed by a conventional data path architecture is now discussed below.

Figure 6:
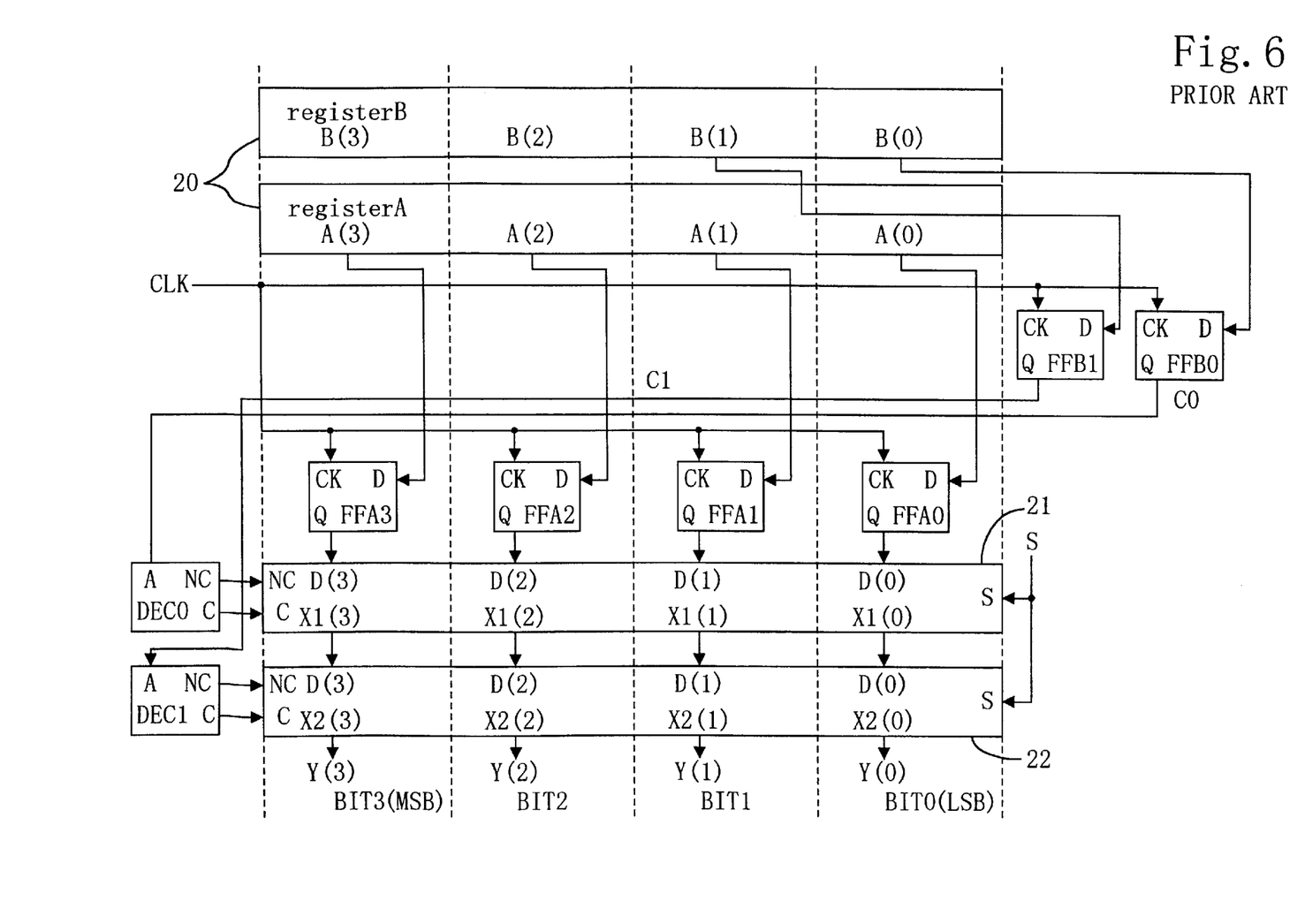
FIG. 6 shows in block form an entire barrel shifter in accordance with a prior art technique.

Referring to FIG. 6, a conventional barrel shifter in the data path is illustrated. A register file 20 has a register A and a register B. The register A prestores, as data subjected to bit shift, four bits (i.e., DATA A(3), DATA A(2), DATA A(1), and DATA A(0)). On the other hand, he register B prestores, as signal that designates a bit shift amount, two bits (DATA B(1) and DATA B(0)).

Four flip-flops FFA3, FFA2, FFA1, and FFA0 receive, from the register A, DATA A(3), DATA A(2), DATA A(1), and DATA A(0), respectively. Two flip-flops FFB1 and FFB0 receive, from the register B, DATA B(1) and DATA B(0), respectively. The output value of each flip-flop is updated by a clock signal CLK.

A decode circuit DEC1 decodes an output C1 from the flip-flop FFB1 and provides decode results in the form of a binary bit shift amount at an output terminal C and at an inverting output terminal NC. Likewise, a decode circuit DEC0 decodes an output C0 from the flip-flop FFB0 and provides decode results in the form of a binary bit shift amount at an output terminal C and at an inverting output terminal NC.

21 is a 1-bit shift section. The 1-bit shift section 21 has input terminals D(3), D(2), D(1), and D(0) at which outputs from the flip-flops FFA3, FFA2, FFA1, and FFA0 are input, respectively. 22 is a 2-bit shift section. The 2-bit shift section 22 has input terminals D(3), D(2), D(1), and D(0) at which outputs from output terminals X1(3), X1(2), X1(1), and X1(0) of the 1-bit shift section 21 are input, respectively. The foregoing bit shift amounts of the decode circuits DEC0 and DEC1 control the 1- and 2-bit shift sections 21 and 22, respectively. Based on the bit shift amount received, the 1-bit shift section 21 either shifts each of the data received on the input terminals D(3), D(2), D(1), and D(0) one bit position or carries out no bit shift.

On the other hand, based on the bit shift amount received, the 2-bit shift section 22 either shifts each of the data received on the input terminals D(3), D(2), D(1), and D(0) two bit positions or carries out no bit shift. Outputs at output terminals X2(3), X2(2), X2(1), and X2(0) of the 2-bit shift section 22 are output results of the barrel shifter. In this way, data, output from the register A, are bit-shifted for bit shift amounts represented by the two low-order bits of the register B.

Figure 7:
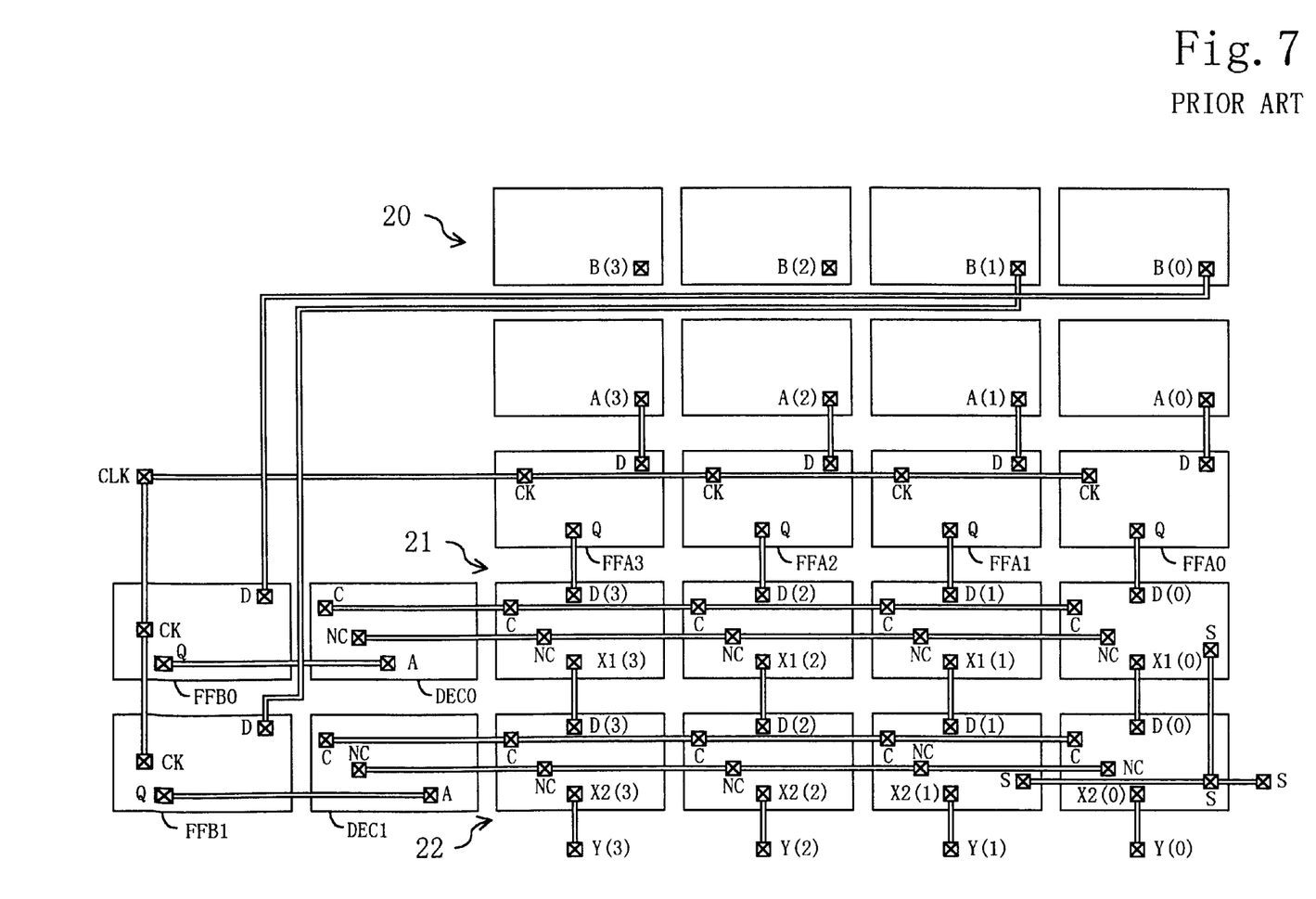
FIG. 7 shows a layout of the conventional barrel shifter.

FIG. 7 is a layout of the bit shifter shown in FIG. 6. Referring to FIG. 7, the register file 20, the four flip-flops FFA3, FFA2, FFA1, and FFA0, the 1-bit shift section 21, and the 2-bit shift section 22 are symmetrically laid out in bits in a bit slice structure to form a 4-bit data path.

Referring still to FIG. 7, whereas the decode circuit DEC0 is laid out on the left-hand side of the 1-bit shift section 21, the decode circuit DEC1 is laid out on the left-hand side of the 2-bit shift section 22. Whereas the flip-flop FFB1 is laid out on the left-hand side of the decode circuit DED1, the flip-flop FFB0 is laid out on the left-hand side of the decode circuit DEC0. In other words, the decode circuits DEC0 and DEC1 and the two flip-flops FFB0 and FFB1 are laid out outside the 4-bit data path.

In a barrel shifter designed in accordance with a conventional data path architecture, generally a bit slice structure with a mask layout which is symmetrical in bits includes only the register file 20, the flip-flops FFA3, FFA2, FFA1, and FFA0 that receive data subjected to bit shift, the 1-bit shift section 21, and the 2-bit shift section 22. Both the flip-flops FFB0 and FFB1 that receive data designating a bit shift amount and the decode circuits DEC0 and DED1 are laid out outside the data path. In Japanese Patent Application Publication no. 7-141146, the decode circuits are arranged outside a data path.

However, in the above-described prior art barrel shifter layout structure, both the flip-flops FFB0 and FFB1 that receive bit-shift-amount data and the decode circuits DEC0 and DED1 that decode the bit-shift-amount data are laid out outside the data path. Such arrangement produces the disadvantage that transmission of bit-shift-amount data and bit-shift-amount signals from outside the data path to inside the data path or vice versa is required extra. Proportionally, the rate of barrel shifter operation decreases. For example, in the FIG. 7 layout structure, there is created a great separation between the register file 20 and the two flip-flops FFB0 and FFB1. This results in an increase in the wiring length between the register file 20 and the flip-flops FFB0 and FFB1. This causes a delay in the timing of determining input signals to the flip-flops FFB0 and FFB1, resulting in a drop in the barrel shifter operation rate.

SUMMARY OF THE PRESENT INVENTION

Accordingly, an object of the present invention is to achieve a reduction of the length of signal wiring used for bit-shift-amount data propagation in order to provide an improved barrel shifter capable of fast bit shift with a less wiring delay time.

The present invention was made based on the knowledge that the number of bit-shift-amount data's bits is smaller than the number of to-be-bit-shifted data's bits (for example, if data subjected to bit shift is formed of four bits then bit-shift-amount data is formed of two bits, if data subjected to bit shift is formed of 16 bits then bit-shift-amount data is formed of four bits or less, and if data subjected to bit shift is formed of 32 bits then bit-shift-amount data is formed of five bits or less). Because of the fact that the sum of the number of bit-shift-amount data's bits and the number of bits of a bit-shift-amount signal of a decode circuit falls below the number of to-be-bit-shifted data's bits, a structure is employed in which flip-flops that receive bit-shift-amount data and decode circuits are laterally laid out in a line and within a data path.

The present invention provides a layout structure for a decoder-containing barrel shifter comprising:

a data input section to which data consisting of a plurality of bits is input;

a control signal input section which consists of a less number of bits than the number of the input data's bits and which inputs a shift amount control signal;

a decode circuit which consists of a less number of bits than the number of the input data's bits, which receives the shift amount control signal from the control signal input section, and which converts the received shift amount control signal into a binary bit shift amount; and a bit shifter which consists of an equal number of bits to the number of the input data's bits and which bit-shifts the input data for the bit shift amount upon receipt of the bit shift amount and the input data;

wherein:

the control signal input section and the decode circuit are laterally laid out in a line; and the control signal input section, the decode circuit, the data input section, and the bit shifter are symmetrically laid out in bits.

It is preferred that the decode circuit is laid out on the side of the highest-order bit of the control signal input section, being next to the control signal input section.

In accordance with the above-described layout structure of the present invention, the control signal input section and the decode circuit are laid out within a data path. The present invention can reduce the length of wiring from input of bit-shift-amount data to the control signal input section to input of a bit-shift-amount signal decoded by the decode circuit to the bit shifter, thereby making it possible to achieve a reduction of the barrel shifter wiring load. The present invention accordingly provides an improved barrel shifter with a decode circuit capable of carrying out fast bit shift with a less wiring delay time.

BRIEF DESCRIPTION OF THE DRAWINGS

Preferred embodiments of this invention are described by reference to the accompanying drawings in which.

DETAILED DESCRIPTION OF THE PRESENT INVENTION

Preferred embodiments of the present invention are now described by making reference to the accompanying drawing figures.

Figure 1:
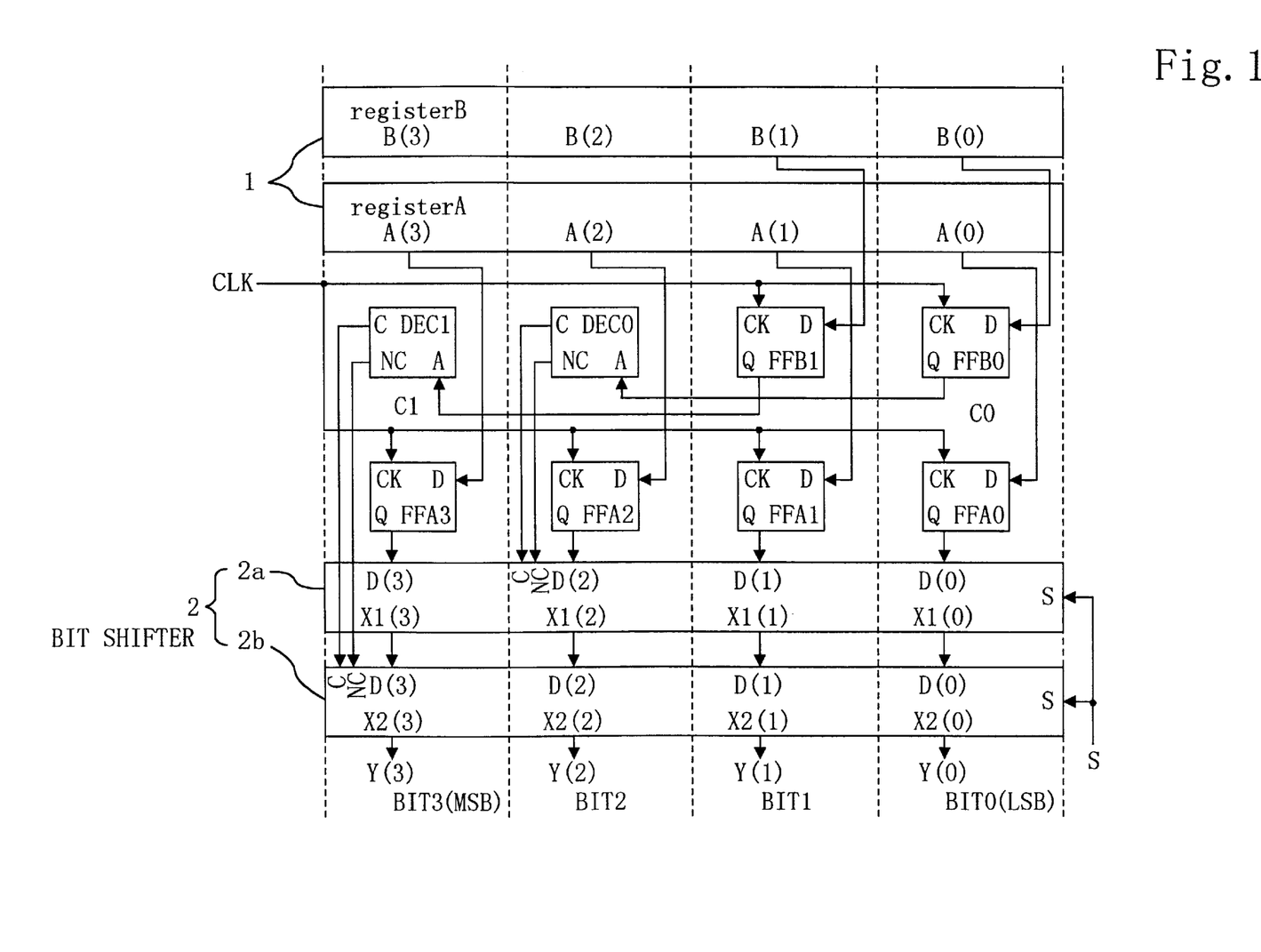
FIG. 1 shows in block form an entire barrel shifter in accordance with the present invention.
Figure 2:
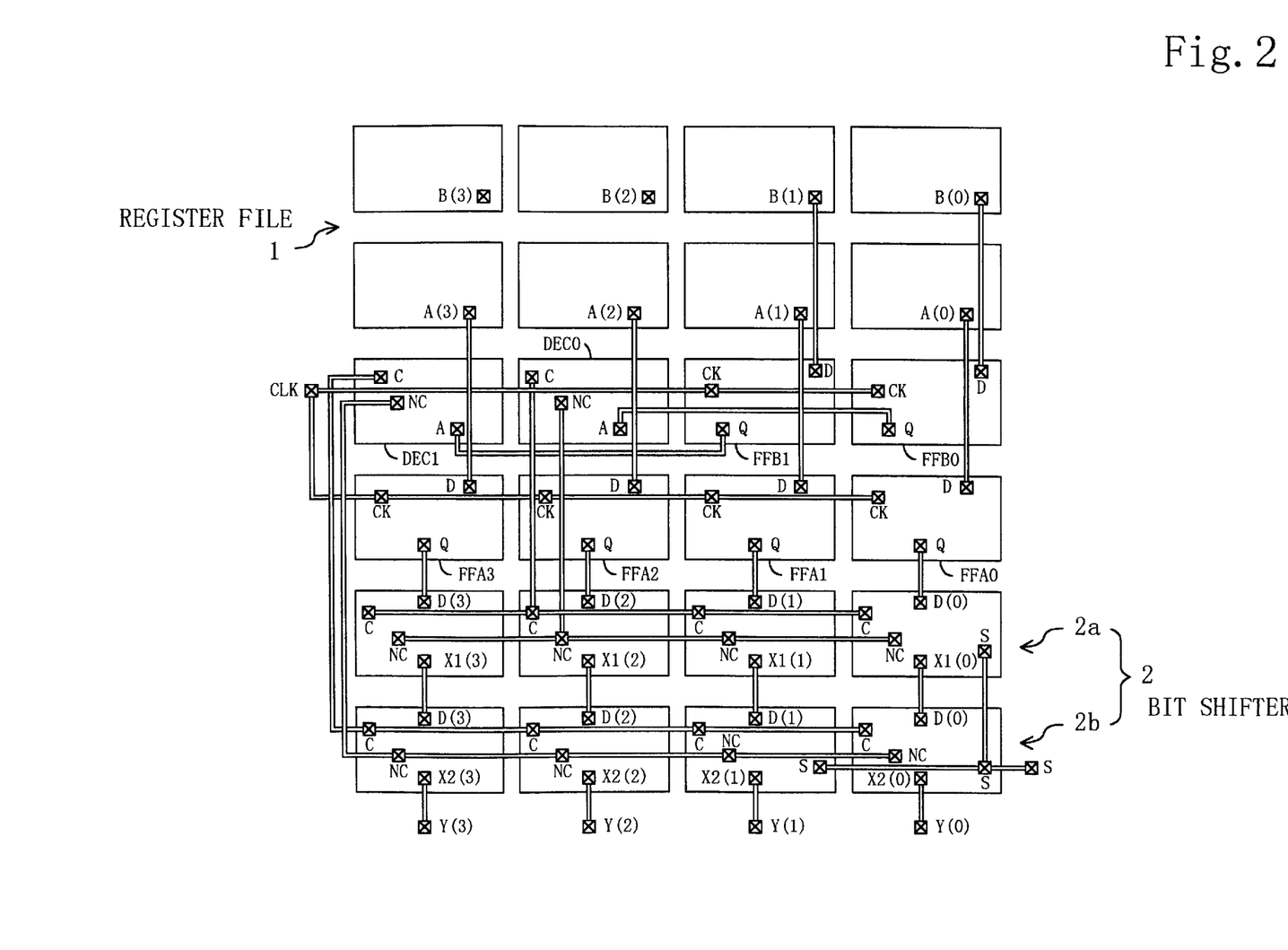
FIG. 2 shows a layout of the barrel shifter of FIG. 1.

FIG. 1 shows in block form a barrel shifter of the present invention. FIG. 2 shows a layout structure of the barrel shifter. FIGS. 1 and 2 exemplarily show a barrel shifter having the ability to shift 4-bit data three bit positions at the maximum.

Referring now to FIG. 1, a register file 1 has a register A and a register B. The register A prestores, as data subjected to bit shift, four bits, namely DATA A(3), DATA A(2), DATA A(1), and DATA A(0). On the other hand, the register B prestores, as data which designates a bit-shift-amount, two bits, namely DATA B(1) and DATA B(0).

Four flip-flops (data input sections) FFA3, FFA2, FFA1, and FFA0 receive, from the register A, DATA A(3), DATA A(2), DATA A(1), and DATA A(0), respectively.

Two flip-flops (control signal input sections) FFB1 and FFB0 receive, from the register B, DATA B(1) and DATA B(0), respectively. These six flip-flops update the values of data input at their respective input terminals D at the time when the clock signal (CLK) rises to the level of HIGH and provide the updated values at their respective output terminals Q. When the clock signal CLK is unchanged, the output terminals Q keep providing their respective previous output values.

A decode circuit DEC1 decodes an output C1 from the flip-flop FFB1 and provides decode results in the form of a binary bit shift amount at its output terminals C and NC. On the other hand, a decode circuit DEC0 decodes an output C0 from the flip-flop FFB0 and provides decode results in the form of a binary bit shift amount at its output terminals C and NC.

2 is a bit shifter. The bit shifter 2 is formed by connecting in series a first bit shift section 2a capable of carrying out 1-bit shift and a second bit shift section 2b capable of carrying out 2-bit shift. The 1-bit shift section 2a receives outputs from the four flip-flops FFA3 to FFA0 at its four input terminals D(3) to D(0), respectively. On the other hand, the 2-bit shift section 2b receives outputs from four output terminals X1(3) to X1(0) of the 1-bit shift section 2a at its four input terminals D(3) to D(0), respectively. The 1- and 2-bit shift sections 2a and 2b are controlled by the bit shit amounts from the decode circuits DEC0 and DEC1. Depending upon the received bit shift amount, the 1-bit shift section 2a either shifts the data, received respectively at the input terminals D(3) to D(0), one bit position or carries out no shift. On the other hand, depending upon the received bit shift amount, the 2-bit shift section 2b either shifts the data, received respectively at the input terminals D(3) to D(0), two bit positions or carries out no shift. Outputs from four output terminals X2(3) to X2(0) of the 2-bit shift section 2b become output results Y(3) to Y(0) of the barrel shifter, respectively. In this way, the data, read out of the register A, is bit-shifted by a shift amount represented by the two low-order bits of the register B.

The features of the present invention are now described below. The register file 1, the four flip-flops FFA3 to FFA0 and the bit shifter 2 deal with 4-bit data and have a 4-bit width. On the other hand, the two flip-flops FFB1 and FFB0 and the decode circuits DED1 and DEC0 deal with 2-bit data as a bit shift amount and have a 2-bit width. Accordingly, if the two flip-flops FFB1 and FFB0 are laid out at corresponding locations to two flip-flops of the four flip-flops FFA3 to FFA0 of the two low-order bits (i.e., the flip-flops FFA1 and FFA0) in the FIG. 2 layout, this creates a region on the high-order bit side of the flip-flops FFB1 and FFB0. In other words, a free region exists overlying the flip-flops FFA3 and FFA2 of the two high-order bits. The decode circuits DEC1 and DEC0 are laid out in the region and these decode circuits DEC1 and DEC0 and the flip-flops FFB1 and FFB0 are laterally arranged in line in neighboring fashion.

In FIG. 2, the register file 1 is located above a row of the decode circuits DEC1 and DEC0 and the flip-flops FFB1 and FFB0. The decode circuits DED1 and DEC0 and the flip-flops FFB1 and FFB0 are located above the flip-flops FFA3 to FFA0. Located below the flip-flops FFA3 to FFA0 is the bit shifter 2. As can be seen from FIG. 2, the register file 1, the two flip-flops FFB1 and FFB0, the decode circuits DEC1 and DEC0, the four flip-flops FFA3 to FFA0, and the bit shifter 2 are laid out symmetrically in bits as shown in broken lines of FIG. 1.

Figure 3:
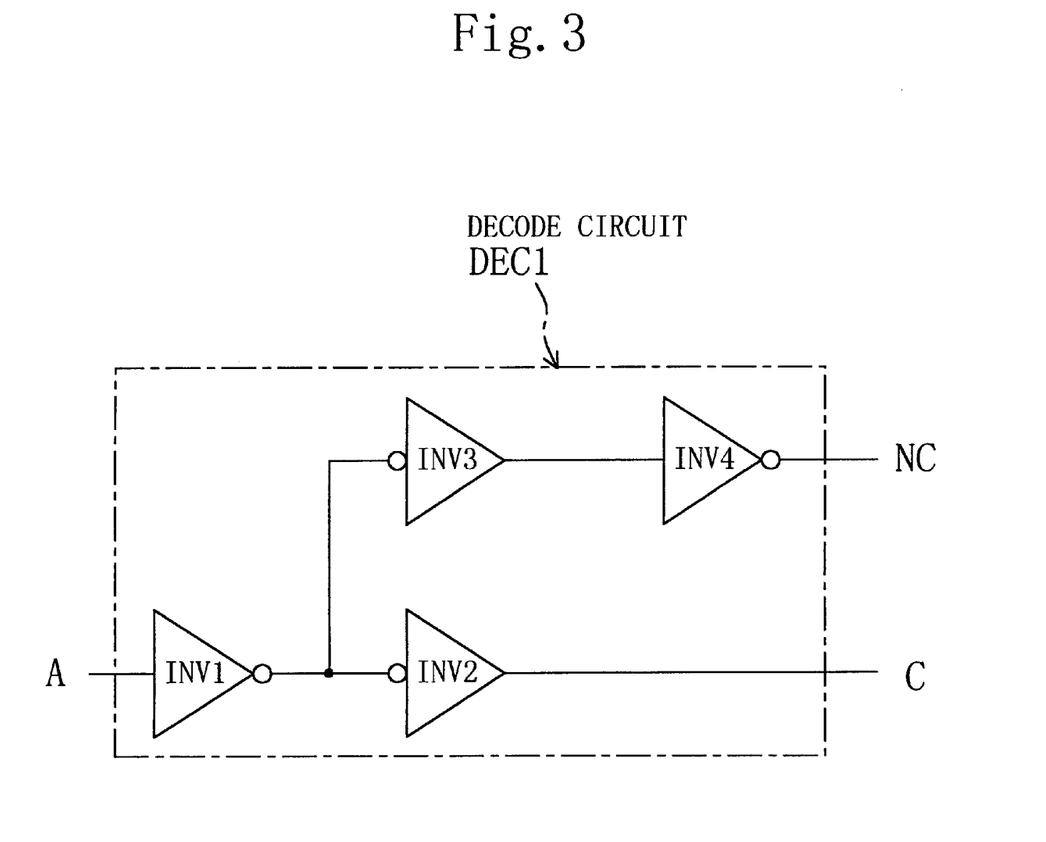
FIG. 3 shows the internal organization of a decode circuit of the barrel shifter of FIG. 1.

Referring now to FIG. 3, shown therein is an internal organization of the decode circuit DED1. The decode circuits DED1 and DEC0 are identical in organization with each other. In FIG. 3, the decode circuit DEC1, which has four inverters INV1 to INV4, receives from the flip-flop FFB1 shift amount data at an input terminal A. The shift data is inverted by the inverter INV1 and then by the inverter INV2 and is output at the output terminal C. Additionally, the shift data is inverted by the inverters INV1, INV3, and INV4 in that order and is output at the inverting output terminal NC.

Figure 4:
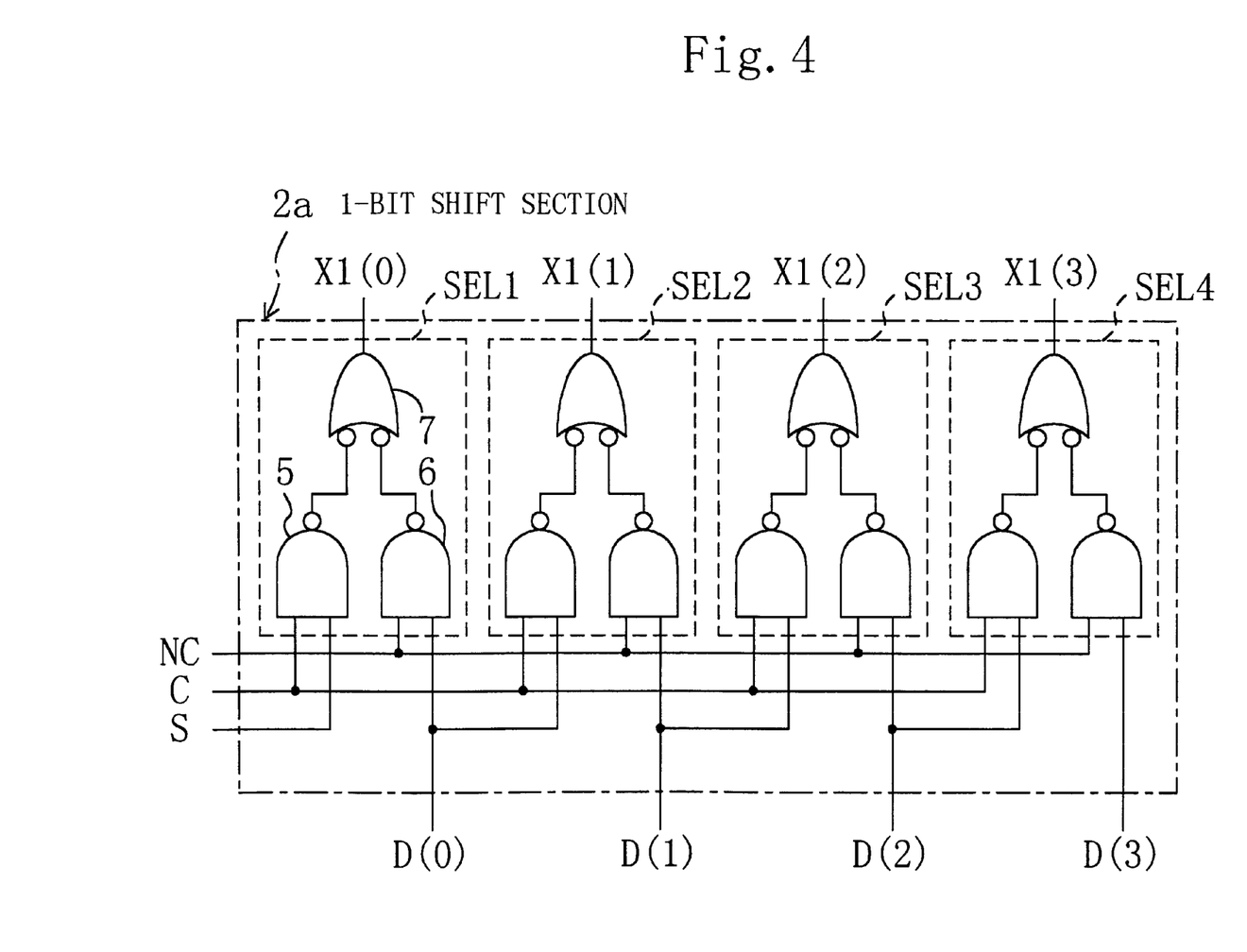
FIG. 4 shows the internal organization of a 1-bit shift section of a bit shifter of the barrel shifter of FIG. 1.

FIG. 4 illustrates an internal organization of the 1-bit shift section 2a. The 1-bit shift section 2a has the same number of selectors as the number of input data's bits. The number of input data's bits is four in the present invention and therefore the 1-bit shift section 2a has four selectors SEL1 to SEL4 having the same organization. These selectors SEL1 to SEL4 are identical in organization and each selector has two 2-input NAND circuits 5 and 6 placed at one stage and one NAND circuit 7 placed at the next stage. In each selector, the NAND circuit 5 receives at one input terminal an output from the output terminal C of the decode circuit DEC0. When the value of the received output is "1" (i.e., when a 1-bit shift is required), data, received at the other input terminal of the NAND circuit 5, is chosen. Accordingly, the NAND circuits 5 of the selectors SEL2 to SEL4 respectively corresponding to the second to the fourth bits each receive data one bit lower, in other words DATA D(0) to DATA D(2) are fed to the NAND circuits 5 of the selectors SEL2 to SEL4, respectively. On the other hand, the NAND circuit 5 of the selector SEL1 corresponding to the first bit receives a code data S as the value of the first bit of data that has been shifted one bit position. In each selector, the NAND circuit 6 receives at one input terminal an output from the inverting output terminal NC of the decode circuit DEC0. When the value of the output of the terminal NC is "1", or when no bit shift is requested, data applied at the other input terminals of the NAND circuits 6 are chosen, in other words corresponding bits (i.e., DATA D(0) to D(3)) are chosen.

Figure 5:
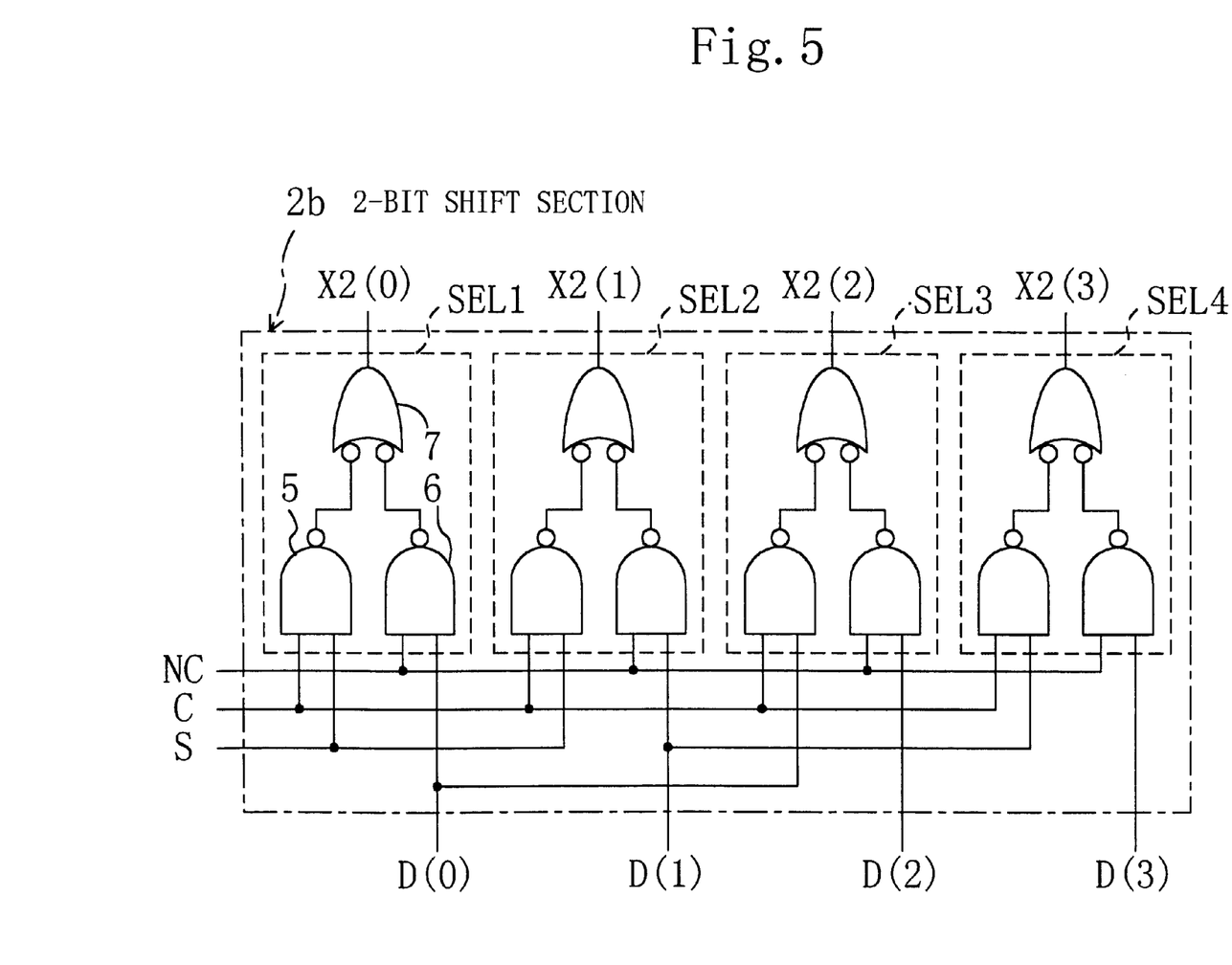
FIG. 5 shows the internal organization of a 2-bit shift section of the bit shifter.

FIG. 5 illustrates an internal organization of the 2-bit shift section 2b. In FIG. 5, the 2-bit shift section 2b has four selectors SEL1 to SE14 identical in organization with one another, like the 1-bit shift section 2a. The difference between these bit shift sections is described. In the 2-bit shift section 2b, the NAND circuits 5 of the selectors SEL3 and SEL4 respectively corresponding to the third and fourth bits each receive data two bits lower (i.e., DATA D(0) and D(1)) while on the other hand the NAND circuits 5 of the selectors SEL1 and SEL2 corresponding to the first and second bits receive the code data S as the values of the first and second bits of data that has been shifted two bit positions.

With the decode circuits DED1 and DEC0 and the flip-flops FFB1 and FFB0 laterally laid out in a line and placed near another, these components and the register file 1, the four flip-flops FFA3 to FFA0, and the bit shifter 2 are symmetrically laid out in bits. The decode circuits DEC1 and DEC0 and the flip-flops FFB1 and FFB2 that deal with bit-shift-amount data are all placed within the data path. This eliminates the need for taking bit-shift-amount data out of the data path or taking bit-shift-amount data into the data path, unlike prior art techniques. Accordingly, it is possible to achieve a reduction of the length of signal wiring necessary for bit-shift-amount data propagation, whereby the rate of signal propagation can be increased and the speed-up of barrel shifter shift operation can be accomplished.

In the 3-bit barrel shifter of the present embodiment, the bit shift amount Y, designated by shift amount control signal, can be given by:

$$Y = A1 \cdot X1 + A0 \cdot X0 \quad \text{(Eq. 1)}$$

where A0 is the output of the output terminal C of the decode circuit DEC0, A1 is the output of the output terminal C of the decode circuit DEC1, X0 (=1) is the shift amount of the 1-bit shift section 2a, and X1 (=2) is the shift amount of the 2-bit shift section 2b. For example, if A0=1 and A1=0, then Y=1. If A0=0 and A1=1, then Y=2. If A0=1 and A1=1, then Y=3. Generally, when the barrel shifter is provided with n series-connected bit shift sections, the bit shift amount Y can be given by the following equation (2).

$$Y = An-1 \cdot Xn-1 + An-2 \cdot Xn-2 + \ldots + A1 \cdot X1 + A0 \cdot X0 \quad \text{(Eq. 2)}$$

The present embodiment has been described in terms of 3-bit barrel shifters; however, the present embodiment may of course applied to n-bit barrel shifters.

Effects of the present embodiment are now discussed. Considering the present embodiment's effects in terms of gate delay time, the following are obtained. The gate delay value T can be approximated using the following equation (3) where T0 is the delay at no-load time, Δt is the delay load dependence coefficient, and C is the output load capacitance. Additionally, the wire capacitance C can be approximated for the case of the wire length L using the following equation (4) where Δc is the wire load capacitance per unit wiring length.

$$T = T0 + C \cdot \Delta t \quad \text{(Eq. 3)}$$

$$C = L \cdot \Delta c \quad \text{(Eq. 4)}$$

In the layout of FIG. 2, the width of the data path section per bit is d and the height is h, the flip-flop no-load time delay (T0) and the flip-flop delay load dependence coefficient (Δt) are T0f and Δtf, and the decoder no-load time delay (T0) and the decoder delay load dependence coefficient (Δt) are T0d and Δtd. In this layout structure, if the bit width of DATA A subjected to bit shift operation is m bits and the bit width of DATA B (the shift amount data) is n bits, the delay time Tc0 from the time the clock signal CLK rises to the time the bit shift amount signals C and NC to the 1-bit shift section 2a are determined can be expressed by the following equation (5). On the other hand, for the case of the FIG. 7 conventional layout structure, the delay time Tc0 can be given by the following equation (6). Accordingly, the delay time difference (Tc06 minus Tc01) can be expressed by the following equation (7).

$$Tc01 = T0f + n \cdot d \cdot \Delta tf \cdot \Delta c + T0d + ((n+1)h + m \cdot d) \cdot \Delta td \cdot \Delta c \quad \text{(Eq. 5)}$$

$$Tc06 = T0f + (m \cdot d + (n+1)h) \cdot \Delta tf \cdot \Delta c + T0d + m \cdot d \cdot \Delta td \cdot \Delta c \quad \text{(Eq. 6)}$$

$$Tc06 - Tc01 = ((m-n) \cdot d \cdot \Delta tf + (n+1)h \cdot (\Delta tf - \Delta td)) \cdot \Delta c \quad \text{(Eq. 7)}$$

Usually, Δtf and Δtd are the same in size, that is they are Δt, and the bit number m is greater than the bit number n. Accordingly, Tc06−Tc01>0 holds. For example, if:

$$\Delta tf = \Delta td = \Delta t = 4 \text{ psec}/fF$$

$$\Delta c = 0.2 \text{ } fF/\mu m \text{ (Eq. 8)}$$

wherein m=32, n=5, and d=h=30 μm, the FIG. 2 layout structure is faster than the FIG. 7 layout structure by a length of time shown by the following equation (9).

$$Tc06 - Tc01 = ((m-n) \cdot d \cdot \Delta tf + (n+1)h \cdot (\Delta tf - \Delta td)) \cdot \Delta c = (m-n) \cdot d \cdot \Delta t \cdot \Delta c = 0.648 \text{ nsec} \quad \text{(Eq. 9)}$$

If the clock frequency is 200 MHz, then 1 Hz=5 nsec cycle. The speed is increased by about 15 percent of the one cycle, which is a great contribution to the operation speed-up.

In the present embodiment, the data to be bit-shifted is 4-bit data and the bit-shift-amount data is 2-bit data; however, the present invention is not limited to such conditions. The bit shifter 2 has an organization to carry out one-way bit shift; however, bi-directional bit shifters may be employed.

The invention claimed is:

1. A layout structure for a decoder-containing barrel shifter comprising:

a data input section to which data consisting of a plurality of bits is input;

a control signal input section which consists of a less number of bits than the number of said input data's bits and which inputs a shift amount control signal;

a decode circuit which consists of a less number of bits than the number of said input data's bits, which receives said shift amount control signal from said control signal input section, and which converts said received shift amount control signal into a binary bit shift amount; and a bit shifter which consists of an equal number of bits to the number of said input data's bits and which bit-shifts said input data for said bit shift amount upon receipt of said bit shift amount and said input data;

wherein:

said control signal input section and said decode circuit are laterally laid out in a line; and said control signal input section, said decode circuit, said data input section, and said bit shifter are symmetrically laid out in bits.

2. The barrel shifter layout structure of claim 1, wherein said decode circuit is laid out on the side of the highest-order bit of said control signal input section, being next to said control signal input section.

3. The barrel shifter layout structure of claim 1 or claim 2, wherein both said control signal input section and said decode circuit are laid out overlying said data input section.

4. The barrel shifter layout structure of claim 1 or claim 2, wherein said bit shifter is constructed of a plurality of series-connected bit shift sections capable of carrying out a bit shift for a predetermined number of bits.

5. The barrel shifter layout structure of claim 1 or claim 2 further comprising a register file for entering said input data into said data input section wherein said register file is symmetrically laid out in bits together with said control signal input section, said decode circuit, said data input section and said bit shifter.

* * * * *